No. 873,393. PATENTED DEC. 10, 1907.
F. H. WAGNER.
HYDRAULIC REVERSING VALVE FOR GAS APPARATUS.
APPLICATION FILED SEPT. 16, 1907.
3 SHEETS—SHEET 1.
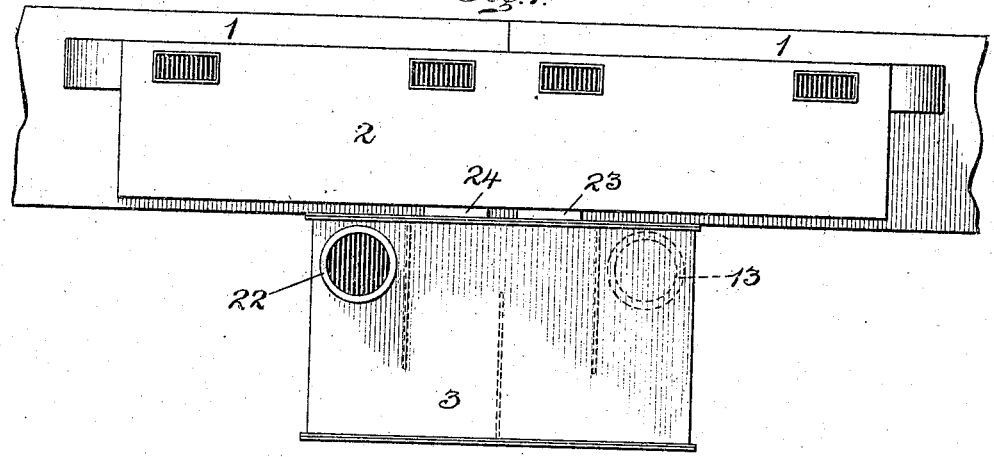
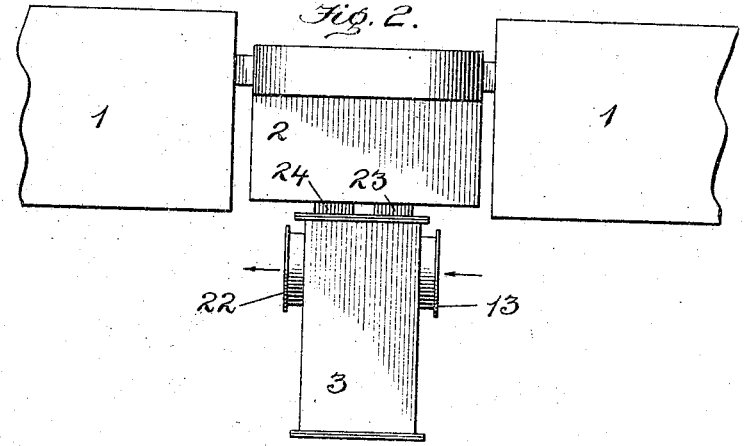
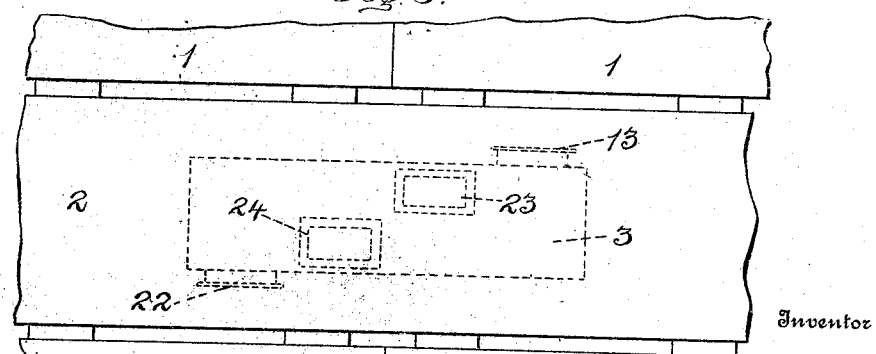

No. 873,393.
PATENTED DEC. 10, 1907.
F. H. WAGNER.
HYDRAULIC REVERSING VALVE FOR GAS APPARATUS.
APPLICATION FILED SEPT. 16, 1907.
3 SHEETS—SHEET 2.
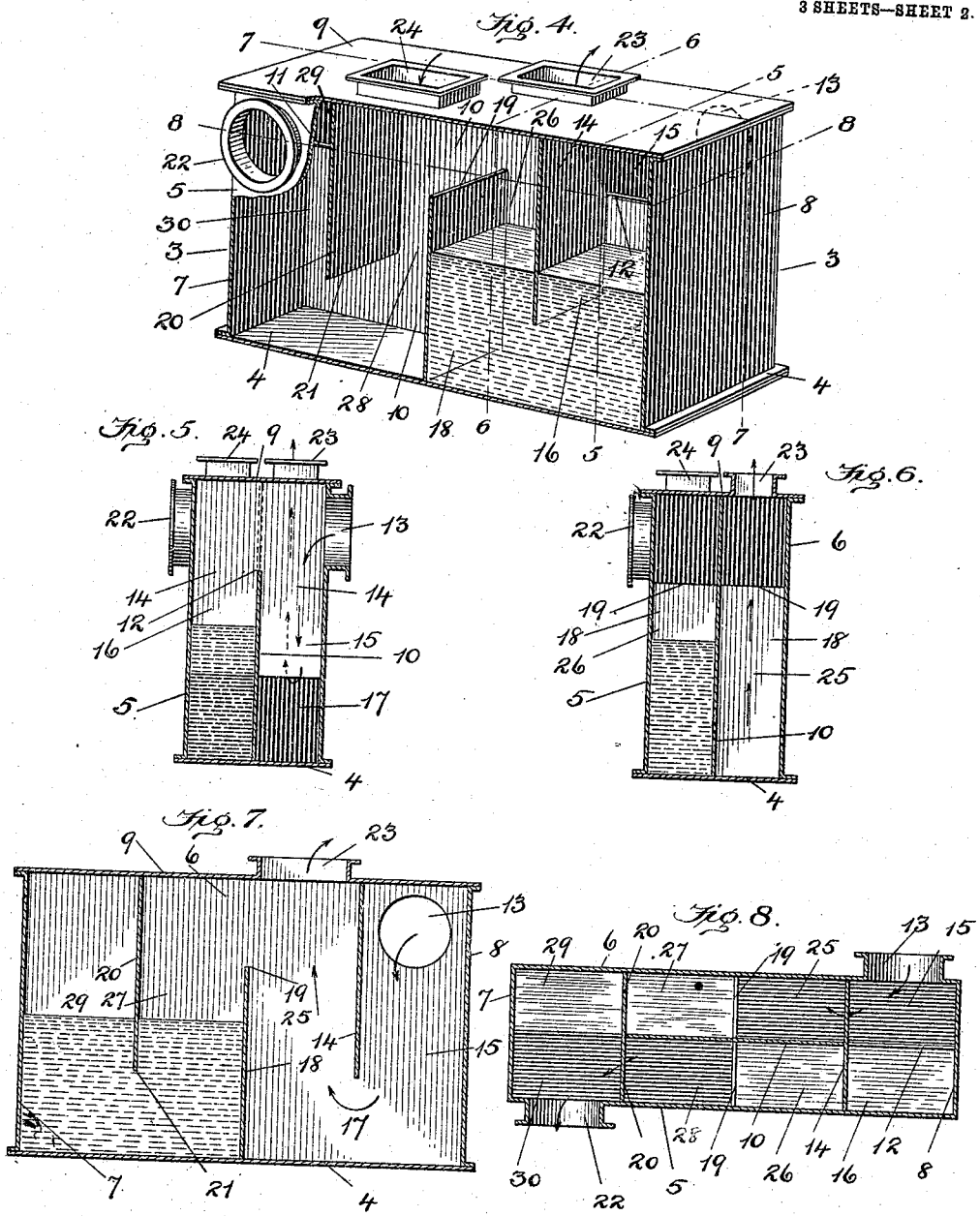
Witnesses
Edwin L. Bradford
G. Ferdinand Vogt.
Inventor
Frederick H. Wagner
By
Mann & Co,
Attorneys No. 873,393.　　　　　　　　　　　　　　　　PATENTED DEC. 10, 1907.
F. H. WAGNER.
HYDRAULIC REVERSING VALVE FOR GAS APPARATUS.
APPLICATION FILED SEPT. 16, 1907.
3 SHEETS—SHEET 3.
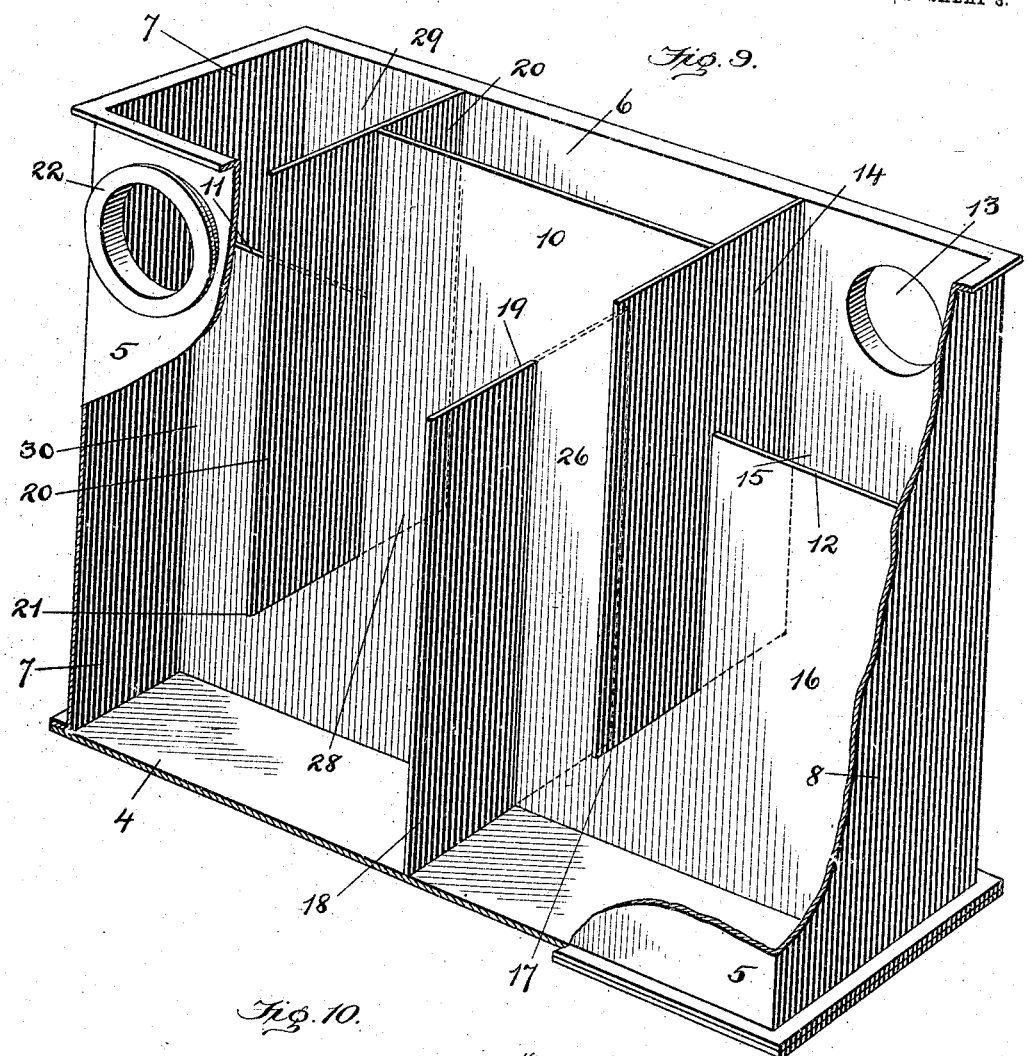
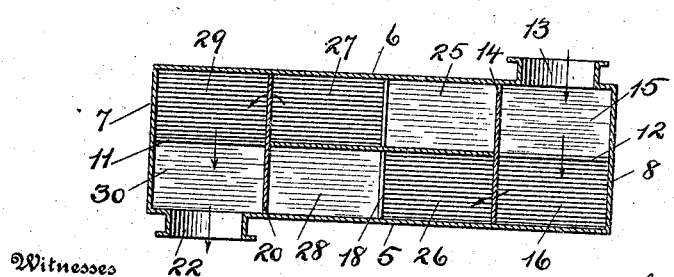
Witnesses
Edwin L. Bradford
G. Ferdinand Vogt
Inventor
Frederick H. Wagner
By Mann & Co,
Attorneys

UNITED STATES PATENT OFFICE.

FREDERICK H. WAGNER, OF BALTIMORE, MARYLAND, ASSIGNOR TO THOMAS J. HAYWARD, TRADING AS BARTLETT, HAYWARD & CO., OF BALTIMORE, MARYLAND.

HYDRAULIC REVERSING-VALVE FOR GAS APPARATUS.

No. 873,393.　　　Specification of Letters Patent.　　　Patented Dec. 10, 1907.

Application filed September 16, 1907. Serial No. 393,062.

*To all whom it may concern:*

Be it known that I, FREDERICK H. WAGNER, a citizen of the United States, residing at Baltimore, in the State of Maryland, have invented certain new and useful Improvements in Hydraulic-Reversing-Valves for Gas Apparatus, of which the following is a specification.

This invention relates to a hydraulic reversing valve for reversing the flow of gas.

The invention is particularly designed for use in conjunction with gas purifying apparatus in which the gas first passes through a center valve which directs it through the purifiers as desired.

One object of the present invention is to provide a hydraulic valve by means of which the flow of the unpurified gas to the center valve may be in either of two directions.

Another object is to provide a reversing valve in which the inlet for the unpurified gas and the outlet for the purified gas may remain the same no matter how the gas may be directed to and from the center valve.

Another object of the invention is to provide a valve for reversing the flow of gas which avoids the use of movable parts and by means of liquid seals interposed between the inlet and outlet thereof to direct the flow of gas therethrough.

With these and other objects in view the invention is illustrated in the accompanying drawings in which.

Figure 1 shows an end elevation of the reversing valve, the center valve connected therewith and a portion of the purifiers in communication with the center valve. Fig. 2 illustrates a side elevation of the center valve and the improved reversing valve. Fig. 3 shows a plan view of portions of the four purifiers with the center valve between them and also shows in broken lines the reversing valve beneath the center valve. Fig. 4 illustrates a perspective view of the detached reversing valve,—one wall of which is broken away to show the passages at one side of the center wall. Fig. 5 shows a cross-sectional view through the reversing valve,—the section being taken on the line 5—5 of Fig. 4. Fig. 6 illustrates a similar view through the reversing valve,—the section being taken on the line 6—6 of Fig. 4. Fig. 7, shows a longitudinal sectional view through the reversing valve,—the section being taken on the line 7—7 of Fig. 4. Fig. 8 illustrates a horizontal sectional view through the same,—the section being taken on the line 8—8 of Fig. 4. Fig. 9 shows a perspective view of the reversing valve,—the exterior walls being broken away to show the arrangement of interior partitions and compartments, and Fig. 10 illustrates a horizontal sectional view through the reversing valve, the sealing of the compartments however being such as to effect a flow of gas in a reverse direction from that shown in Fig. 8.

Referring to Figs. 1, 2 and 3 it should be understood that these views are shown merely for the purpose of illustrating the relation of the improved reversing valve to the center valve and the relative position of the latter and the purifiers.

The particular construction of the center valve and also the purifiers is immaterial and a diagrammatic illustration of them is deemed sufficient for the purpose of the present case.

In the present instance a group of four purifiers, 1, is shown and the center valve, 2, is located so as to be in communication with the purifiers. In actual practice the center valve is arranged so as to direct the flow of gas to be purified through all or any combination of purifiers as desired, but the present invention relates to the reversing valve, 3, that delivers the unpurified gas to the center valve and receives the purified gas from the center valve.

Referring now to Figs. 4 to 9 inclusive it will be seen that the reversing valve comprises a casing or receptacle having a bottom, 4, side walls, 5, and, 6, end walls, 7, and, 8, and a top, 9. A central vertical partition wall, 10, extends longitudinally in the casing between the end walls, 7, and, 8, and the ends, 11, and, 12, of this central wall are shorter or of less height than the distance between the bottom, 4, and top, 9, of the casing, thus leaving a space between the upper edge of said end portions and the top wall and establishing communication between the spaces at opposite sides of the central wall.

By providing a central partition the opposite sides of the casing or receptacle are separated from each other, as will presently more fully appear.

An inlet opening or port, 13, is provided in the side wall, 6, and adjacent the end wall, 8, and said inlet has position in the upper portion of the side wall and opposite the short end, 12, of the central partition.

A vertical partition, 14, extends downwardly from the top, 9, and between the side walls, 5, and, 6, and the lower end of this partition projects in a plane below the upper edge of the short end, 12, of the central partition, 10. This vertical cross partition, 14, has position spaced from the end wall, 8, and beyond the inlet port, 13, in the side wall, 6, so as to form compartments, 15, and, 16, at each side of the central partition. It will be understood that the cross-partition, 14, in the compartments, 15, and, 16, do not extend to the bottom, 4, and that a space, 17, is left between the bottom, and the lower edge of said cross partition, and that a similar space is provided at both sides of the central partition.

Beyond the cross partition and about midway between the ends, the casing or receptacle is provided at each side of the central longitudinal partition with another vertical cross partition, 18. This latter partition extends vertically from the bottom, 4, with its upper edge, 19, terminating in a plane above the lower edge of the partition, 14.

Between the central cross partition, 18, and the outlet end, 7, of the receptacle the latter is provided with a crosswise partition, 20, exactly like the partition, 14, at the opposite end. This crosswise partition, like said partition, 14, extends downwardly from the top, 9, between the side walls, 5, and, 6, and the lower edge, 21, of this partition terminates in a horizontal plane below the plane of the edge, 19, of the central cross partition, 18, and also below the upper edge of the short end, 11, of the central longitudinal partition.

An outlet opening or port, 22, is provided in the side wall, 5, adjacent the end wall, 7, and said port also has position in the upper portion of the side wall opposite the short end, 11, of the longitudinal partition, 10.

From the foregoing description it will be understood that the casing or receptacle is provided at each side of the central partition, 10, with passages and that each passage is provided with a plurality of vertical cross-wise partitions which extend respectively from the bottom and top and that the ends of said partitions overlap so that the partitions that extend downward from the top will project in a plane below the upper edges of the partitions that extend upwardly from the bottom. By this arrangement of vertical partitions the side passages are tortuous and any gas that enters the inlet port, 13, must flow beneath one partition and then up over another in seeking an outlet through the valve or receptacle.

It has hereinbefore been explained that unpurified gas will be delivered to the reversing valve through the port, 13, and from the reversing valve said unpurified gas is to be delivered to the center valve, 2, thence to the purifiers, 1, and the purified gas is then carried back to the center valve and reversing valve respectively, finally passing from the reversing valve by port, 22. No matter in which of the two directions the gas is conveyed through the reversing valve, it always enters the reversing valve by port, 13, and discharges through port, 22.

In order to deliver the gas from the reversing valve to the center valve and to permit its return in a purified condition from the center valve to the reversing valve, two connections, 23, and, 24, are provided between the reversing valve and the center valve. Either of these connections may be employed to convey the unpurified gas to the center valve or to return the purified gas to the reversing valve but for the purposes of illustration the connection, 23, will be presumed to be the one in the present instance to convey the unpurified gas to the center valve while the connection, 24, will enable the purified gas to return to the reversing valve. These connections, in the present instance are shown on the top, 9, of the valve casing or receptacle, and the connection, 23, is located on the inlet side of the longitudinal partition and in a vertical plane between the cross-partitions, 14, and, 18, while the connection, 24, has position on the opposite side of the longitudinal partition and in a vertical plane between the cross-partitions, 18, and, 20.

It should be understood that the side walls, 5, and, 6, fit close against the vertical outer edges of the cross-partitions, 14, 18, and, 20, so that gas must pass beneath one of the partitions, 14, in seeking an outlet to the center valve.

It will thus be understood that all of the walls and partitions described are stationary and immovable in the reversing valve. The operation of the valve will now be explained.

With the understanding that the unpurified gas entering the port, 13, is to be conveyed through the connection, 23, to the center valve which latter will direct it in a desired course through the purifiers, and that the purified gas in the present instance will be returned to the reversing valve from the center valve through connection, 24, and discharged through port, 22, the operation will be explained.

For the purpose of distinguishing the spaces on opposite sides of the central partition, 10, the side of the valve where the gas enters will be termed the inlet side while the opposite side will be termed the outlet side, and to distinguish the individual spaces on said two sides those on the inlet side are designated by numerals, 15, 25, 27, and, 29, while those on the outlet side are designated by numerals, 16, 26, 28, and, 30.

The compartments, 29, and, 27, at the inlet side of the valve will be supplied with a liquid, such as water, the depth of the liquid therein being sufficient to submerge the lower end, 21, of the cross partition, 20, but the level of the liquid in these compartments will remain below the upper edge of the center cross partition, 18, as plainly seen in Fig. 7. It will thus be seen that a liquid seal is thus provided between compartments, 27, and, 29, to prevent the passage of gas from one to the other.

At the outlet side of the valve and at the opposite end thereof the compartments, 16, and, 26, will likewise contain sufficient liquid to submerge the lower end of the partition, 14, and thereby effect a liquid seal between these two compartments. It will thus be seen that two adjoining compartments at each end of the valve are liquid sealed while two other adjoining compartments at opposite ends of the valve are not liquid sealed, thus four compartments are sealed and four are not sealed.

The gas to be purified will enter through port, 13, and be delivered into compartment, 15. It cannot pass through compartment, 16, because of the liquid seal in the bottom of the latter but it can pass beneath the partition, 14, into compartment, 25, because of the unsealed space, 17, between the two and consequently the unpurified gas will flow into compartment, 25. As compartments, 27, and, 29, are sealed the gas to be purified cannot pass in that direction from compartment, 25, and it must therefore pass up through the connection, 23, and enter the center valve, 2. The center valve will be adjusted to cause the unpurified gas to pass through the purifiers in any well known manner and to then receive it in a purified condition from said purifiers. The connection, 24, of the reversing valve will be made with that portion of the center valve from which the purified gas would ordinarily be carried off and the purified gas will then pass through connection, 24, into the improved reversing valve, being received into the compartment, 28, at the outlet side of the valve. As the purified gas cannot now pass through compartment, 26, because of the seal between compartments, 26, and, 16, it must flow beneath cross partition, 20, into compartment, 30, and through the outlet, 22. The purified gas after entering compartment 30, cannot pass over the short end, 11, of the center partition, 10, and through compartment, 29, because the latter is sealed from compartment, 27, and has no outlet.

While the several compartments are sealed as just described the unpurified gas must enter port, 13, and pass out through connection, 23, while the purified gas must enter through connection, 24, and pass out through port, 22.

Now suppose it is desirable as it often is, to reverse the flow of gas through the reversing valve, the center valve and purifiers, the reversal may be accomplished without a change in either the center valve or the purifiers, by simply altering the liquid seals in the reversing valve. In effecting a reversal of the flow through the reversing valve the compartments, 16, and, 26, and, 27, and, 29, will be drained of the liquid in any suitable manner such as by means of a pump and the compartments, 15, and, 25, and, 28, and, 30, will then be supplied with liquid. The inlet, 13, and outlet, 22, however remain the same. The unpurified gas will enter the inlet port, 13, as before but as compartments, 15, and, 25, are sealed from each other and the unpurified gas cannot pass that way it must pass over the short end, 12, of the center partition into compartment, 16, and from the latter it can flow into compartment, 26, beneath the partition, 14. Compartments, 28, and, 30, are also sealed in this reversed operation and the unpurified gas cannot pass through them but as connection, 24, to the center valve is open the unpurified gas will now pass through this connection, 24, to the center valve and then sent in a reverse direction through the latter and also through the purifiers. The connection, 23, now serves to return the purified gas to the reversing valve, whereas before it directed the unpurified gas to the center valve, and the purified gas now entering through connection, 23, will pass from compartment, 27, beneath partition, 20, into compartment, 29, then over the short end, 11, of the center partition and across compartment, 30, to outlet, 22. The pure gas cannot now find outlet from compartment, 30, to compartment, 28, because of the liquid seal and consequently it must flow through the outlet, 22.

It will thus be understood that by merely changing the liquid from one set of compartments to another set a complete reversal of the flow of gas is effected through the center valve and purifiers without making any alteration whatever in the center valve.

Having thus described my invention what I claim is,—

1. A gas apparatus comprising the purifiers, a center valve for directing the flow of gas to the purifiers and having two gas ports and a reversing valve having connection with the two gas ports of the center valve for directing the flow of gas through either of said center valve ports.

2. A gas apparatus comprising a plurality of purifiers, a center valve having a plurality of connections with each purifier and also having two gas ports to receive and discharge gas, and a reversing valve having connection with the two gas ports of the center valve, and means in the reversing valve for permitting gas to flow in either direction through the connections between the reversing valve and the center valve.

3. A valve for reversing the flow of gas comprising a casing having a main gas inlet and a main gas outlet and also having an outlet and an inlet both of which are interposed between said main inlet and main outlet, and a plurality of compartments in said casing.

4. A valve for reversing the flow of gas comprising a casing having a permanent gas inlet and a permanent gas outlet and also having an outlet and an inlet which are interposed between the permanent inlet and outlet, and means within the casing for directing the flow of gas in either direction through the interposed inlet and outlet.

5. A valve for reversing the flow of gas comprising a casing having a permanent gas inlet and a permanent gas outlet and also having an inlet and an outlet which are interposed between the permanent inlet and outlet and a liquid sealed compartment in the casing between the permanent inlet and the permanent outlet.

6. A valve for reversing the flow of gas comprising a casing having a main inlet and a main outlet and a plurality of connections for the flow of gas between said main inlet and main outlet and a plurality of connections for the flow of gas between said main inlet and main outlet, and a liquid seal interposed between the main inlet and one of said connections.

7. A valve for reversing the flow of gas comprising a casing having a main inlet and a main outlet and a plurality of connections for the flow of gas that are interposed between said main inlet and outlet, a liquid seal interposed between the main inlet and one of said connections and a liquid seal interposed between the main outlet and another of said connections.

8. A valve for reversing the flow of gas comprising a casing having a main inlet and a main outlet and a plurality of connections for the flow of gas that are interposed between the said main inlet and outlet, a plurality of compartments in said casing, means whereby a liquid seal may be interposed in the compartments between the main inlet, the main outlet and one of said connections.

9. A valve for reversing the flow of gas comprising a casing having a main inlet and a main outlet, a partition in the casing between said inlet and outlet, a connection at one side of the partition for permitting the escape of gas from the casing, a connection at the other side of the partition for permitting the inlet of gas to the casing and said connections being interposed between the main inlet and the main outlet.

10. A valve for reversing the flow of gas comprising a casing having main inlet and outlet ports and inlet and outlet ports interposed between the said main ports, a partition in said casing and separating the main ports from each other and also separating the interposed ports from each other and forming passages at each side of said partition, and means in said passages to permit the flow of gas from the main inlet through either of the interposed connections.

11. A valve for reversing the flow of gas comprising a casing having main inlet and outlet ports and interposed inlet and outlet ports between the main ports, a partition extending longitudinally through the casing between the main ports, and partitions extending crosswise of the casing whereby to permit a plurality of liquid seals to be formed between the inlets and outlets.

12. A valve for reversing the flow of gas comprising a casing having a permanent inlet port and a permanent outlet port and also having a plurality of interchangeable inlet and outlet ports which are interposed between the permanent inlet and outlet ports, a partition extending longitudinally through the casing in a plane between the permanent inlet and outlet ports and said partition having an opening at each end adjacent the said permanent ports, and a plurality of cross partitions in the casing at each side of the longitudinal partition and forming a plurality of compartments whereby to permit a plurality of liquid seals to be formed between the inlets and outlets.

In testimony whereof I affix my signature in presence of two witnesses.

FREDERICK H. WAGNER.

Witnesses:
CHARLES B. MANN, Jr.,
G. FERDINAND VOGT.